No. 686,391. Patented Nov. 12, 1901.
J. M. COX.
SCREW COUPLING.
(Application filed Apr. 2, 1901.)
(No Model.)
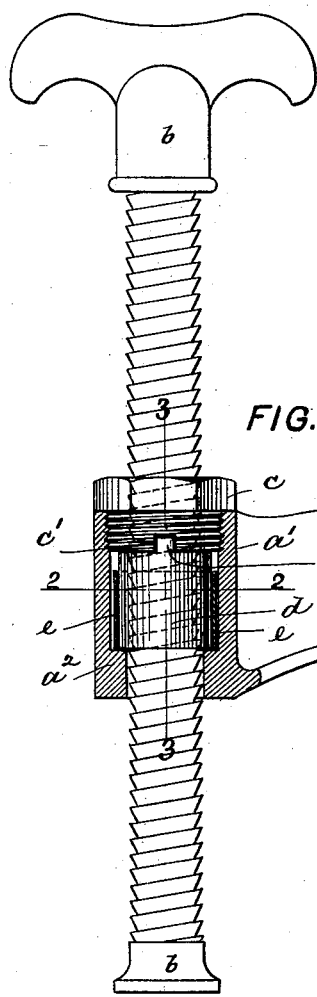
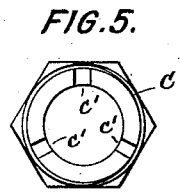
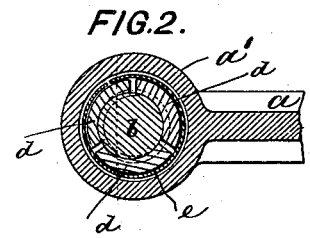
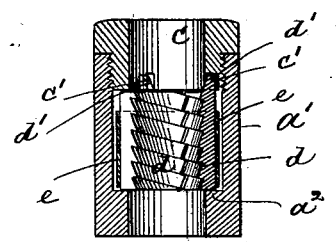
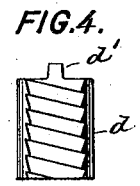
Witnesses:
John Becker
William Schulz
Inventor:
James M. Cox
by his attorneys
Roeder & Briesen
THE NORRIS PETERS CO., PHOTO-LITHO., WASHINGTON, D. C.

UNITED STATES PATENT OFFICE.

JAMES M. COX, OF NEW YORK, N. Y., ASSIGNOR TO UNITED STATES COUPLER AND MANUFACTURING COMPANY, OF EAST ORANGE, NEW JERSEY, A CORPORATION OF NEW JERSEY.

SCREW-COUPLING.

SPECIFICATION forming part of Letters Patent No. 686,391, dated November 12, 1901.

Application filed April 2, 1901. Serial No. 54,035. (No model.)

*To all whom it may concern:*

Be it known that I, JAMES M. COX, a citizen of the United States, and a resident of New York city, county and State of New York, have invented certain new and useful Improvements in Screw-Couplings, of which the following is a specification.

This invention relates to that class of screw-couplings in which an expanding nut or female member permits the screw or male member to be rapidly advanced by being pushed axially through the nut.

The object of the invention is to permit a free expansion and contraction of the nut and to so hold the sections constituting the same that while a free radial movement is permitted, any displacement is effectively prevented. By my invention also all the parts of the coupling may be readily assembled and separated for the purpose of repair or replacement.

In the accompanying drawings, Figure 1 is a longitudinal section, partly in elevation, of a screw-clamp provided with my improved coupling. Fig. 2 is a cross-section on line 2 2, Fig. 1; Fig. 3, a longitudinal section on line 3 3, Fig. 1; Fig. 4, a detail side view of one of the nut-sections, and Fig. 5 a bottom view of the threaded sleeve $c$.

The letter $a$ represents the usual bent arm of a screw-clamp, having the socket or perforated head $a'$ for the passage of the screw $b$, which constitutes the male member of the coupling. The screw $b$ is loosely embraced by an externally-threaded sleeve $c$ engaging the upper internally-threaded end of head $a'$ and provided with a wrench-head, by means of which it may be inserted or removed. The lower edge of the sleeve $c$ is provided with a number of notches $c'$, which are preferably equally spaced.

Beneath the sleeve $c$ the screw $b$ is surrounded by the expanding nut that constitutes the female member of the coupling. This nut is composed of a number of curved threaded sections $d$, that are supported upon the bottom plate $a^2$ of socket $a'$ and which are provided at their upper ends with lugs $d'$, Fig. 4. These lugs $d'$ are of such a size and they are so spaced that each lug is received by one of the notches $c'$ of the sleeve $c$. Around the nut-sections $d$ the socket $a'$ is enlarged laterally to form a chamber within which the nut may expand. This chamber also serves for the reception of a band-spring $e$, that embraces the nut-sections and holds them in engagement with the screw $b$.

When the screw is pushed downward, the spring $e$ will yield and the nut-sections will be displaced radially to permit the passage of the screw-threads. When the screw is arrested, the nut-sections will be thrown into engagement with the screw by the spring $e$, so that the screw may now be further advanced by rotation in the usual manner. By means of the engagement of the lugs $d'$ with the notches $c'$, the nut-sections will be properly assembled and held against displacement, while their free expansion and contraction in a radial direction may always take place.

Though the screw-coupling has been shown to be applied to a clamp-screw, it is evident that it may be applied to other tools and implements in which an expansion-nut is employed.

What I claim is—

1. A screw-coupling composed of a male member, a surrounding notched collar, a female member composed of nut-sections having lugs adapted to engage the notched collar, and a spring engaging the female member, substantially as specified.

2. A screw-coupling composed of a socket, a male member passing into the same, a notched collar engaging the socket and embracing the male member, a number of nut-sections arranged within the socket and having lugs that engage the notched collar, and a spring engaging the nut-sections, substantially as specified.

Signed by me at New York city, county and State of New York, this 1st day of April, 1901.

JAMES M. COX.

Witnesses:
WILLIAM SCHULZ,
F. V. BRIESEN.